US011521578B2

(12) United States Patent
Boyack et al.

(10) Patent No.: US 11,521,578 B2
(45) Date of Patent: Dec. 6, 2022

(54) SECURELY PRESENTING CONTENT ON A DISPLAY

(71) Applicant: LENOVO (Singapore) PTE. LTD., New Tech Park (SG)

(72) Inventors: Gordon Boyack, Durham, NC (US); Russell Speight VanBlon, Raleigh, NC (US); Thorsten P. Stremlau, Morrisville, NC (US); Kevin Wayne Beck, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/147,149

(22) Filed: Jan. 12, 2021

(65) Prior Publication Data

US 2022/0223121 A1 Jul. 14, 2022

(51) Int. Cl.
*G06F 21/84* (2013.01)
*G09G 5/14* (2006.01)
*G09G 5/10* (2006.01)

(52) U.S. Cl.
CPC .............. *G09G 5/14* (2013.01); *G06F 21/84* (2013.01); *G09G 5/10* (2013.01); *G09G 2320/0626* (2013.01); *G09G 2358/00* (2013.01)

(58) Field of Classification Search
CPC .... G09G 5/14; G09G 5/10; G09G 2320/0626; G09G 2358/00; G06F 21/84; H04N 5/913; H04N 2005/91314; H04N 2005/91392
See application file for complete search history.

(56) References Cited

U.S. PATENT DOCUMENTS

| 7,043,019 | B2 * | 5/2006 | Tehranchi | ............ H04N 9/3179 382/248 |
| 2004/0033060 | A1 * | 2/2004 | Beaton | .................... H04N 5/913 386/257 |
| 2006/0029252 | A1 * | 2/2006 | So | .................... H04N 21/23892 380/201 |
| 2009/0128779 | A1 * | 5/2009 | Moshe | .................... G03B 21/32 352/204 |
| 2015/0009248 | A1 * | 1/2015 | Bracalente | .............. G06F 21/16 345/691 |

* cited by examiner

*Primary Examiner* — Antonio A Caschera
(74) *Attorney, Agent, or Firm* — Kunzler Bean & Adamson (57) ABSTRACT

Apparatuses, methods, systems, and program products securely present content on a display. An apparatus includes a processor and a memory that stores code executable by the processor. The code is executable by the processor to logically divide content to be presented on a display into a plurality of portions and randomly determine security display settings for each of the plurality of portions such that the plurality of portions are presented on the display with their respective security display settings at a frequency above a threshold of human persistence of vision but below camera shutter speeds. The code is executable by the processor to encode the randomly determined security display settings in metadata for each of the plurality of portions prior to the content being presented on the display and send the content, including the encoded security display settings, to the display.

20 Claims, 5 Drawing Sheets

SECURELY PRESENTING CONTENT ON A DISPLAY

FIELD

The subject matter disclosed herein relates to data privacy and security and more particularly relates to securely presenting content on a display.

BACKGROUND

Confidential, sensitive, or other types of private data may be secured while it is stored, but when it is presented on a display it is out in the open. Onlookers, bystanders, and other people may attempt to capture images of the content that is presented or may attempt to intercept the data before it reaches the display that it is presented on.

BRIEF SUMMARY

Apparatuses, methods, systems, and program products are disclosed for securely presenting content on a display. An apparatus includes a processor and a memory that stores code executable by the processor. The code is executable by the processor to logically divide content to be presented on a display into a plurality of portions. The code is executable by the processor to randomly determine security display settings for each of the plurality of portions of the content such that the plurality of portions are presented on the display with their respective security display settings at a frequency above a threshold of human persistence of vision but below camera shutter speeds. The code is executable by the processor to encode the randomly determined security display settings in metadata for each of the plurality of portions of content prior to the content being presented on the display. The code is executable by the processor to send the content, including the encoded security display settings for the plurality of portions of the content, to the display for presentation on the display.

A method for securely presenting content on a display, in one embodiment, includes logically dividing, by a processor, content to be presented on a display into a plurality of portions. The method, in further embodiments, includes randomly determining security display settings for each of the plurality of portions of the content such that the plurality of portions are presented on the display with their respective security display settings at a frequency above a threshold of human persistence of vision but below camera shutter speeds. In certain embodiments, the method includes encoding the randomly determined security display settings in metadata for each of the plurality of portions of content prior to the content being presented on the display. In further embodiments, the method includes sending the content, including the encoded security display settings for the plurality of portions of the content, to the display for presentation on the display.

A computer program product for securely presenting content on a display, in one embodiment, includes a computer readable storage medium having program instructions embodied therewith. In certain embodiments, the program instructions are executable by a processor to cause the processor to logically divide content to be presented on a display into a plurality of portions. In some embodiments, the program instructions are executable by a processor to cause the processor to randomly determine security display settings for each of the plurality of portions of the content such that the plurality of portions are presented on the display with their respective security display settings at a frequency above a threshold of human persistence of vision but below camera shutter speeds. In further embodiments, the program instructions are executable by a processor to cause the processor to encode the randomly determined security display settings in metadata for each of the plurality of portions of content prior to the content being presented on the display. In certain embodiments, the program instructions are executable by a processor to cause the processor to send the content, including the encoded security display settings for the plurality of portions of the content, to the display for presentation on the display.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus includes a processor and a memory that stores code executable by the processor. The code is executable by the processor to logically divide content to be presented on a display into a plurality of portions. The code is executable by the processor to randomly determine security display settings for each of the plurality of portions of the content such that the plurality of portions are presented on the display with their respective security display settings at a frequency above a threshold of human persistence of vision but below camera shutter speeds. The code is executable by the processor to encode the randomly determined security display settings in metadata for each of the plurality of portions of content prior to the content being presented on the display. The code is executable by the processor to send the content, including the encoded security display settings for the plurality of portions of the content, to the display for presentation on the display.

In one embodiment, the security display settings comprise random refresh rates and/or frame rates for the plurality of portions such that the portions of the content are presented at different frequencies that are above the threshold of human persistence of vision but below camera shutter speeds.

In one embodiment, the security display settings comprise random intervals for the plurality of portions to present a blank display instead of the content for the plurality of portions, the intervals being above the threshold of human persistence of vision but below camera shutter speeds.

In one embodiment, the security display settings comprise random brightness settings for the plurality of portions such that the brightness settings for the plurality of portions are altered at a rate that is above the threshold of human persistence of vision but below camera shutter speeds.

In one embodiment, the code is executable by the processor to randomly scramble the plurality of portions prior to sending the content to the display such that the plurality of portions are presented in a random order when presented on displays that do not support decoding the encoded security display settings.

In one embodiment, the code is executable by the processor to encrypt the scrambled plurality of portions of the content prior to sending the plurality of portions to the display. In some embodiments, information that is used to scramble the plurality of portions is sent to the display for use in descrambling the plurality of portions prior to presenting the content on the display.

In one embodiment, the code is executable by the processor to determine random intervals for applying different security display settings such that the same security display settings for the plurality of portions are not applied at the same time. In some embodiments, the display comprises a virtual reality display comprising at least two displays, the security display settings for the plurality of portions being applied to portions of the content presented on the at least two displays.

In one embodiment, the frequency for presenting the plurality of portions on the display with their respective security display settings is determined as a function of the camera shutter speeds such that the displayed content appears illegible if captured by a camera.

In one embodiment, the code is executable by the processor to encode the security display settings using a random seed value that is used to randomly determine the security display settings, the random seed value sent to the display and used at the display to decode the security display settings for the plurality of portions. In some embodiments, the random seed value is one of a plurality of random seed values that are generated and used independently for each of the plurality of portions of the content to determine the security display settings for each portion.

In one embodiment, the content is logically divided into a plurality of portions comprising a plurality of blocks of pixels, and wherein sizes of the blocks are determined as a function of a size of the display.

A method for securely presenting content on a display, in one embodiment, includes logically dividing, by a processor, content to be presented on a display into a plurality of portions. The method, in further embodiments, includes randomly determining security display settings for each of the plurality of portions of the content such that the plurality of portions are presented on the display with their respective security display settings at a frequency above a threshold of human persistence of vision but below camera shutter speeds. In certain embodiments, the method includes encoding the randomly determined security display settings in metadata for each of the plurality of portions of content prior to the content being presented on the display. In further embodiments, the method includes sending the content, including the encoded security display settings for the plurality of portions of the content, to the display for presentation on the display.

In one embodiment, the security display settings comprise random refresh rates and/or frame rates for the plurality of portions such that the portions of the content are presented at different frequencies that are above the threshold of human persistence of vision but below camera shutter speeds.

In one embodiment, the security display settings comprise random intervals for the plurality of portions to present a blank display instead of the content for the plurality of portions, the intervals being above the threshold of human persistence of vision but below camera shutter speeds.

In one embodiment, the security display settings comprise random brightness settings for the plurality of portions such that the brightness settings for the plurality of portions are altered at a rate that is above the threshold of human persistence of vision but below camera shutter speeds.

In one embodiment, the method includes randomly scrambling the plurality of portions prior to sending the content to the display such that the plurality of portions are presented in a random order when presented on displays that do not support decoding the encoded security display settings.

In one embodiment, the method includes determining random intervals for applying different security display settings such that the same security display settings for the plurality of portions are not applied at the same time.

A computer program product for securely presenting content on a display, in one embodiment, includes a computer readable storage medium having program instructions embodied therewith. In certain embodiments, the program instructions are executable by a processor to cause the processor to logically divide content to be presented on a display into a plurality of portions. In some embodiments, the program instructions are executable by a processor to cause the processor to randomly determine security display settings for each of the plurality of portions of the content such that the plurality of portions are presented on the display with their respective security display settings at a frequency above a threshold of human persistence of vision but below camera shutter speeds. In further embodiments, the program instructions are executable by a processor to cause the processor to encode the randomly determined security display settings in metadata for each of the plurality of portions of content prior to the content being presented on the display. In certain embodiments, the program instructions are executable by a processor to cause the processor to send the content, including the encoded security display settings for the plurality of portions of the content, to the display for presentation on the display.

Figure 1:
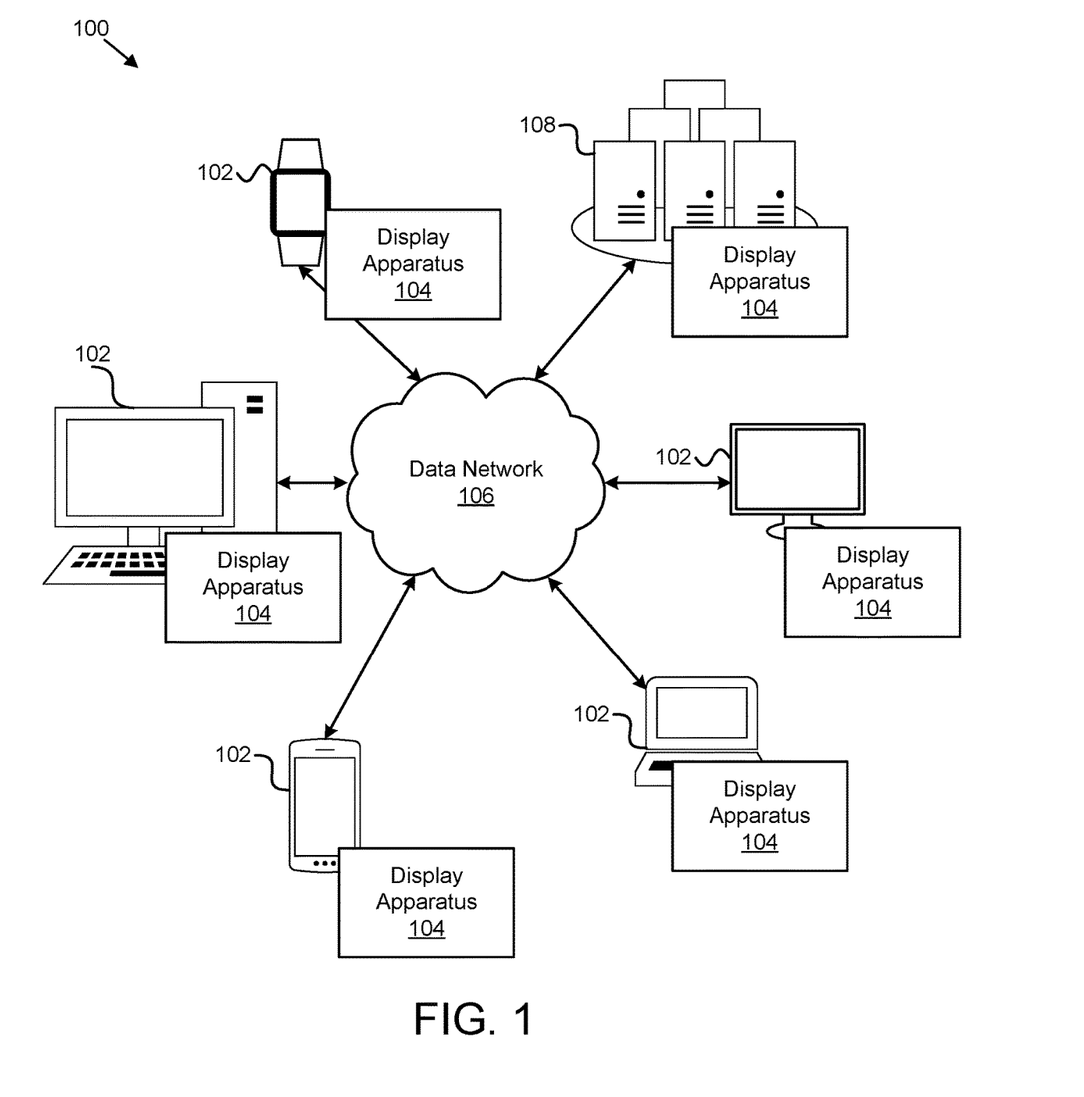
FIG. 1 is a schematic block diagram illustrating one embodiment of a system for securely presenting content on a display.

FIG. 1 is a schematic block diagram illustrating one embodiment of a system 100 for securely presenting content on a display. In one embodiment, the system 100 includes one or more information handling devices 102, one or more display apparatuses 104, one or more data networks 106, and one or more servers 108. In certain embodiments, even though a specific number of information handling devices 102, display apparatuses 104, data networks 106, and servers 108 are depicted in FIG. 1, one of skill in the art will recognize, in light of this disclosure, that any number of information handling devices 102, display apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the display apparatus 104 is configured to logically divide content to be presented on a display into a plurality of portions and randomly determine security display settings for each of the plurality of portions of the content such that the plurality of portions are presented on the display with their respective security display settings at a frequency above a threshold of human persistence of vision but below camera shutter speeds. The display apparatus 104 is further configured to encode the randomly determined security display settings in metadata for each of the plurality of portions of content prior to the content being presented on the display and send the content, including the encoded security display settings for the plurality of portions of the content, to the display for presentation on the display.

In this manner, the display apparatus 104 can protect content presented on a display from being captured with a camera or presented on unauthorized displays while also allowing the content to be viewed clearly with the human eye. The display apparatus 104, including its various sub-modules, may be located on one or more information handling devices 102 in the system 100, one or more servers 108, one or more network devices, and/or the like. The display apparatus 104 is described in more detail below with reference to FIG. 2.

In one embodiment, at least a portion of the display apparatus 104 is located on a display, an information handling device 102, a server 108, and/or the like. In certain embodiments, a portion of the display apparatus 104 encodes the security settings for the content, as described below, on a computing device and transmits the encoded content to a display, where it is decoded and presented on the display according to the security display settings. In this manner, if the content is intercepted during the transmission between the device and the display, it will be illegible to the interceptor because the interceptor does not have the information to decode the encoded security display settings.

In certain embodiments, the display apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the display apparatus 104 may include a power interface, a wired and/or wireless network interface, a graphical interface that attaches to a display, and/or a semiconductor integrated circuit device as described below, configured to perform the functions described herein with regard to the display apparatus 104.

The display apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the display apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the display apparatus 104.

The semiconductor integrated circuit device or other hardware appliance of the display apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the display apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and/or displays and may host, store, stream, or the like data such as user data, anonymized data, files, and content.

Figure 2:
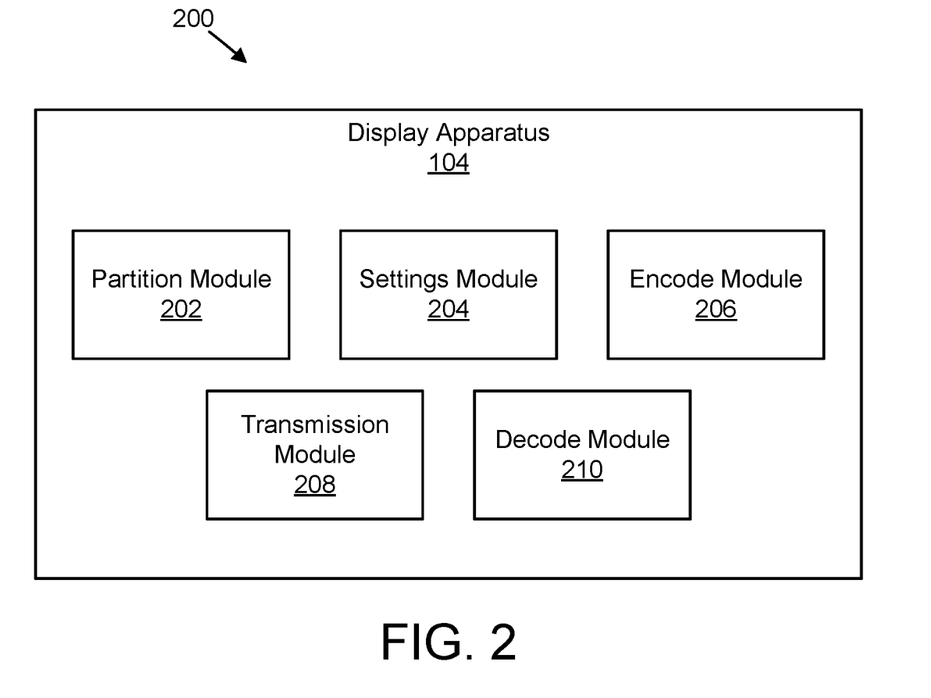
FIG. 2 is a schematic block diagram illustrating one embodiment of an apparatus for securely presenting content on a display.

FIG. 2 is a schematic block diagram illustrating one embodiment of an apparatus 200 for securely presenting content on a display. In one embodiment, the apparatus 200 includes an instance of a display apparatus 104. In one embodiment, the display apparatus 104 includes one or more of a partition module 202, a settings module 204, an encode module 206, a transmission module 208, and a decode module 210, which are described in more detail below.

The partition module 202, in one embodiment, is configured to logically divide content to be presented on a display into a plurality of portions. The content may include images, videos, web sites, slide presentations, and/or the like. The partition module 202 may logically divide the content into different portions, for example, each pixel may be a portion, a group or block of pixels may be a portion, parts of the content may comprise the portions (e.g., text content may be divided from image content, which may further be divided from background content, and/or the like), display areas may comprise different portions (e.g., left half/right half, quadrants, and/or the like), and/or the like.

The sizes of the portions may be determined based on the size or resolution of the display where the content is being presented. For instance, the partition module 202 may logically divide the content into larger portions, or into many smaller portions, if the content is displayed on a larger display, e.g., a 100" projector screen, a 75" monitor, or the like. The partition module 202 may use the size of the display to calculate the number of portions, the sizes of the portions, and/or the like. The portions may be equally sized, may have different sizes, may have different shapes, may have randomly determined shapes, and/or the like. In one embodiment, the number, sizes, and/or shapes of the portions may be randomly determined based on a random seed value or other seed into a random number generator.

The settings module 204, in one embodiment, is configured to randomly determine security display settings for each of the plurality of portions of the content such that the plurality of portions are presented on the display with their respective security display settings at a frequency above a threshold of human persistence of vision but below camera shutter speeds. This may otherwise be known as the flicker fusion threshold, which may refer to the frequency at which an intermittent light stimulus appears to be completely steady to the average human observer. In such an embodiment, the security display settings are randomly determined using a random seed value or other seed into a random number generator. In certain embodiments, the random seed value is one of a plurality of random seed values that are generated and used independently for each of the plurality of portions of the content to determine the security display settings for each portion.

In this manner, different display effects can be presented on the display for each of the logically determined portions of the content without a human observer noticing the effects; however, the frequency with which the effects are presented may be noticeable in an image from a camera that has a shutter speed below the frequency that the security effects are presented.

In one embodiment, the frequency for presenting the plurality of portions on the display with their respective security display settings is determined as a function of the camera shutter speeds such that the displayed content appears illegible if captured by a camera. For instance, the settings module 204 may determine or reference a list or table of camera shutter speeds and determine a frequency for each of the plurality of portions of the content for displaying their respective security effects such that the security effects are presented within a range of the human persistence of vision, e.g., the flicker fusion threshold, and the camera shutter speed. The frequency may be randomly determined for each portion such that the portions do not display their respective security effects at the same rate or frequency.

In one embodiment, the security display settings comprise random refresh rates and/or frame rates for the plurality of portions such that the portions of the content are presented at different frequencies. As used herein, a refresh rate may refer to a number of times per second that a portion of the display device displays a new image (usually measured in Hertz). For each of the portions of the content, the settings module 204 may randomly determine a refresh rate so that the portions refresh at different rates (e.g., one portion refreshes at 30 MHz and another portion refreshes at 29 MHz and another portion refreshes at 31 MHz, and/or the like). The randomly determined rate for each portion comprises a frequency that is above the threshold of human persistence of vision but below camera shutter speeds.

In one embodiment, the security display settings comprise random intervals for the plurality of portions to present a blank display instead of the content for the plurality of portions. In such an embodiment, the settings module 204 may determine a random interval, rate, frequency, or the like (e.g., every third refresh present a blank screen, every 30 milliseconds present a blank screen, and/or the like) with which a blank screen (e.g., a screen that is a solid color such as black, white, red, or the like) is presented for each of the portions of the display. The settings module 204 may randomly determine intervals for presenting a blank screen that are above the threshold of human persistence of vision but below camera shutter speeds.

In one embodiment, the security display settings comprise random brightness settings for the plurality of portions such that the brightness settings for the plurality of portions are altered at a rate that is above the threshold of human persistence of vision but below camera shutter speeds. The brightness setting, as used herein, may refer to a perception elicited by the luminance of a visual target. The brightness setting may be on a scale, e.g., 0 (dark) to 100 (brightest), may change on a per-color basis (e.g., changing red, green, and/or blue levels for pixels in a portion of the content, and/or the like).

The random brightness setting may determine a radiance level (e.g., how dim or how bright a portion appears) for each of the portions of the content, may determine a brightness gradient for each of the portions of the content, and/or the like. The brightness setting may be changed, modified, altered, or the like from the original brightness level at a rate that is above the threshold of human persistence of vision but below camera shutter speeds.

In one embodiment, the settings module 204 determines random intervals for applying different security display settings such that the same security display settings for the plurality of portions are not applied at the same time. For instance, each portion may apply different display effects at one time so that the same display effects are not applied by each of the portions at the same time. For example, some portions may display a blank screen while other portions display different brightness settings, which are all performed at the randomly determined refresh rates such that the display effects are not noticeable to the naked eye but are capturable by a camera (see FIGS. 3A-3C).

The encode module 206, in one embodiment, is configured to encode the randomly determined security display settings in metadata for each of the plurality of portions of content prior to the content being presented on the display. In such an embodiment, the encode module 206 may be located on a computing device that is communicatively coupled to a display, e.g., over an HDMI, VGA, DVI, or other cable connection. In such an embodiment, the settings module 204 may determine the security display settings in real-time, on the fly, and/or the like, which the encode module 206 stores, captures, records, and/or the like in metadata for each portion of the content, e.g., each pixel, each group/block of pixels, and/or the like, prior to sending the content to the display for presentation on the display.

In one embodiment, the encode module 206 encodes the security display settings for the plurality of portions using a random seed value that is used to randomly determine the security display settings, discussed above. The encode module 206, in certain embodiments, may use some other shared information such as a display serial number, a content identifier, a device identifier, and/or the like, to encode the security display settings. For instance, the random seed value may be sent to the display as part of the security display settings and used to decode the security display settings at the display; to duplicate, replicate, or the like the security display settings at the display; and/or the like.

The transmission module 208, in one embodiment, is configured to send the content, including the encoded security display settings for the plurality of portions of the content, to the display for presentation on the display. The transmission module 208 may send the portions of the content, including the security display settings, over a communication link between a computing device and the display, e.g., an HDMI connection, a DVI connection, a VGA connection, a wireless connection, and/or the like.

In one embodiment, the transmission module 208 randomly scrambles the plurality of portions prior to sending the content to the display such that the plurality of portions are presented in a random order when presented on displays that do not support decoding the encoded security display settings. The transmission module 208, for instance, may determine a random seed value for scrambling the portions of the content and may encrypt and send the random seed value to the display so that the portions can be put in the correct order prior to presentation on the display (e.g., the random seed value is decrypted and used to put the portions in the correct order). In this manner, a man-in-the-middle attacker or some other interceptor of the content may not be able to recreate the order of the portions if the portions are intercepted prior to being received at the display, e.g., during transmission, and the interceptor attempts to display the portions on a display that is not capable of unscrambling the portions.

In certain embodiments, other information may be used to scramble the order of the portions of the content such as placing the portions in reverse order, swapping columns and rows of the portions, swapping other logical divisions of the portions, and/or the like.

In one embodiment, the transmission module 208 is configured to encrypt the scrambled plurality of portions of the content prior to sending the plurality of portions to the display. The transmission module 208, for instance, may use various encryption schemes such as symmetric encryption (where the computing device and the display share the encryption key for encryption and decryption), public-key encryption (where the computing device encrypts the portions of the content with the display's public key and the display decrypts the encrypted portions using a private key), and/or the like.

In certain embodiments, the information that is used to scramble the plurality of portions is sent to the display for use in descrambling the plurality of portions prior to presenting the content on the display. For instance, the transmission module 208 may send an identifier the indicates the scrambling method used, may send the random seed value that can be used to place the portions in the correct order, and/or the like.

In one embodiment, the decode module 210 is configured to decode the encoded metadata for the portions of the content at the display and present the portions according to the encoded security display settings. The decode module 210, for example, may use the random seed value for each portion, or some other shared information such a display serial number, a content identifier, a device identifier, and/or the like, to decode the security display settings. The decode module 210 may then direct or cause the portions of the content to be displayed according to the decoded security display settings, e.g., with the encoded display rates, brightness levels, blank screen presentation, and/or the like.

In one embodiment, the display may be embodied a virtual reality display comprising at least two displays, e.g., a head-mounted display unit. In such an embodiment, the security display settings for the plurality of portions are applied to portions of the content presented on the at least two displays, e.g., the partition module 202 may logically divide the content presented on the left display and the right display of a head-mounted display unit and the security display settings may be set for each of the portions such that the left and right displays are both partitioned and provided with different security display settings for the portions of the content presented on the left and right displays.

Figure 3A:
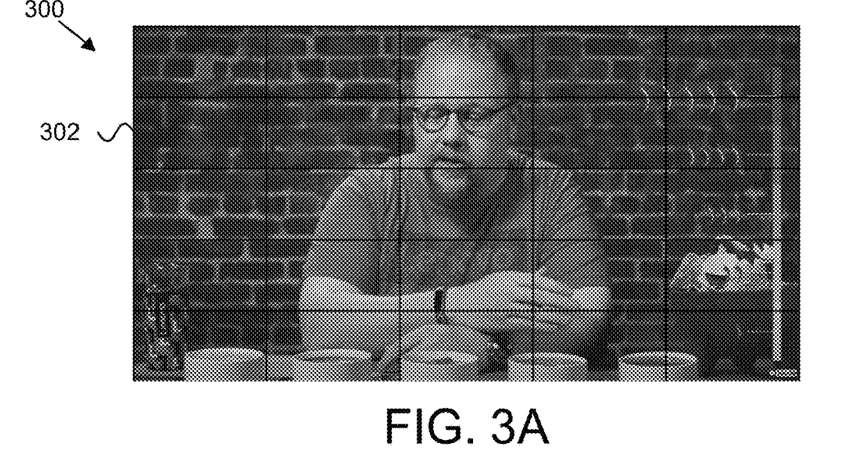
FIG. 3A is an example embodiment of a display for securely presenting content on a display.

FIG. 3A shows an example of a display 300 with content partitioned into different blocks 302, in this case twenty blocks total. As seen by the naked eye, the content appears perfectly normal, legible, and clear. The user will not notice that the portions 302 of the content are presenting images at different refresh rates, brightness levels, or even inserting blank portions at random intervals, as shown in FIG. 3B, because the security display settings are applied at a random frequency that is above a threshold of human persistence of vision.

Figure 3B:
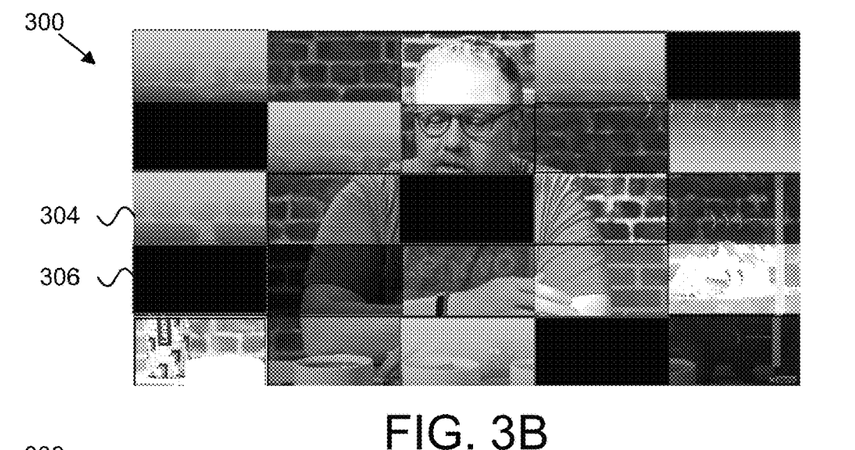
FIG. 3B is an example embodiment of a display for securely presenting content on a display.

FIG. 3B shows the example display 300 of FIG. 3A from the perspective of an image captured with a camera. As shown in FIG. 3B, some of the portions 302 are presented with different brightness levels 304, some display a blank screen 306, and others appear in their original format. In such an embodiment, the portions 302 are presented at different refresh rates and with security display settings at different intervals such that the portions 302 do not all present the same brightness levels or blank screens at the same refresh rates or at the same time. Accordingly, because the security display settings are applied at a frequency above a threshold of human persistence of vision but below camera shutter speeds, the image looks fine to the naked eye as shown in FIG. 3A but looks like the depiction in FIG. 3B when captured with a camera.

Figure 3C:
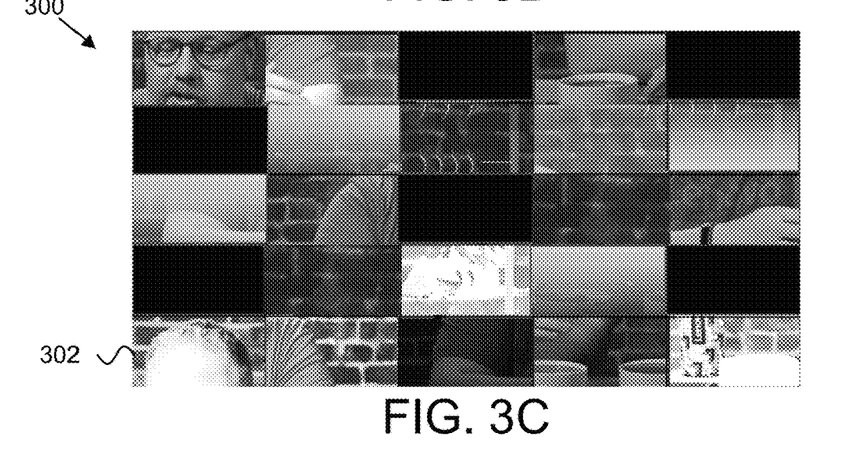
FIG. 3C is an example embodiment of a display for securely presenting content on a display.

FIG. 3C shows the example display 300 of FIG. 3A from the perspective of a display that is not capable or authorized to present the content. In such an embodiment, the content portions 302 are presented out of order, e.g., scrambled, with their respective security display settings, e.g., random brightness levels, random blank screens, random refresh rates, and/or the like. In this manner, the content may be protected from an interceptor or man-in-the-middle attacker that misappropriates the content prior to it reaching the display. With even more portions 302, e.g., on a per-pixel or small group of pixel basis, it becomes even more complicated and difficult to reassemble the portions 302, which is further complicated with the introduction of the security display settings.

Figure 4:
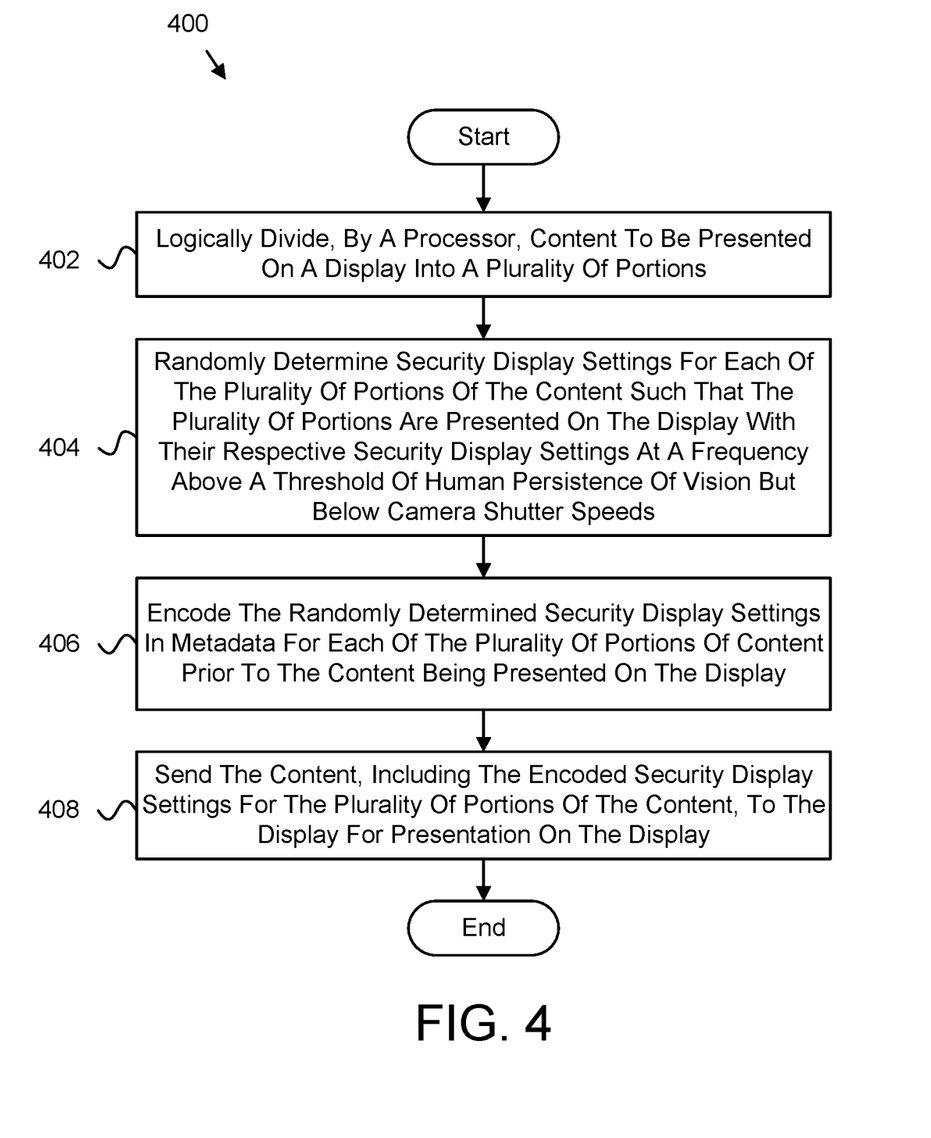
FIG. 4 is a schematic flow chart diagram illustrating one embodiment of a method for securely presenting content on a display.

FIG. 4 is a schematic flow chart diagram illustrating one embodiment of a method 400 for securely presenting content on a display. In one embodiment, the method 400 begins and logically divides 402, by a processor, content to be presented on a display into a plurality of portions. In some embodiments, the method 400 randomly determines 404 security display settings for each of the plurality of portions of the content such that the plurality of portions are presented on the display with their respective security display settings at a frequency above a threshold of human persistence of vision but below camera shutter speeds.

In one embodiment, the method 400 encodes 406 the randomly determined security display settings in metadata for each of the plurality of portions of content prior to the content being presented on the display. In further embodiments, the method 400 sends 408 the content, including the encoded security display settings for the plurality of portions of the content, to the display for presentation on the display, and the method 400 ends. In one embodiment, the partition module 202, the settings module 204, the encode module 206, and the transmission module 210 perform the various steps of the method 400.

Figure 5:
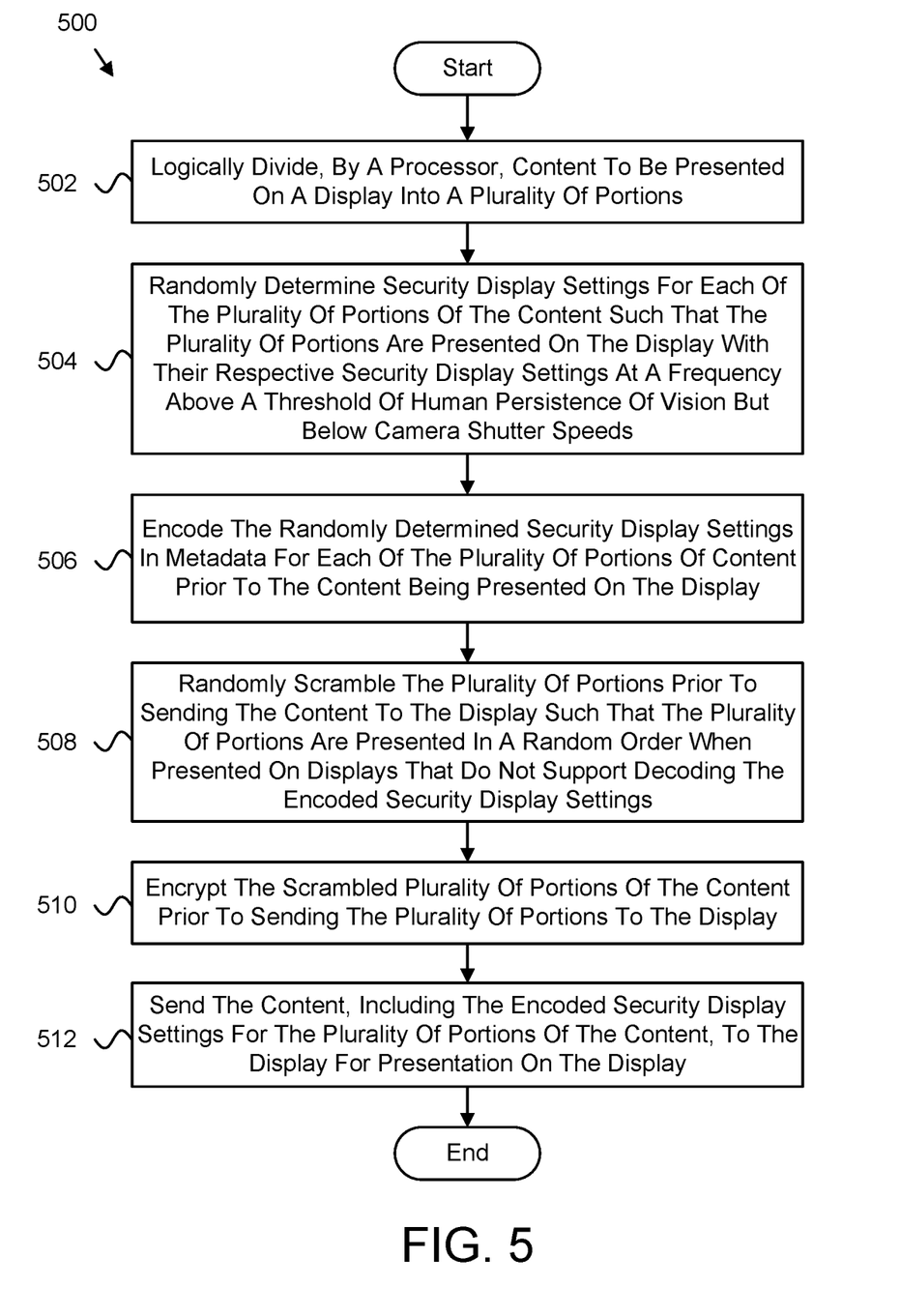
FIG. 5 is a schematic flow chart diagram illustrating one embodiment of another method for securely presenting content on a display.

FIG. 5 is a schematic flow chart diagram illustrating one embodiment of a method 500 for securely presenting content on a display. In one embodiment, the method 500 begins and logically divides 502 content to be presented on a display into a plurality of portions. In further embodiments, the method 500 randomly determines 504 security display settings for each of the plurality of portions of the content such that the plurality of portions are presented on the display with their respective security display settings at a frequency above a threshold of human persistence of vision but below camera shutter speeds.

In one embodiment, the method 500 encodes 506 the randomly determined security display settings in metadata for each of the plurality of portions of content prior to the content being presented on the display. In some embodiments, the method 500 randomly scrambles 508 the plurality of portions prior to sending the content to the display such that the plurality of portions are presented in a random order when presented on displays that do not support decoding the encoded security display settings.

In further embodiments, the method 500 encrypts 510 the scrambled plurality of portions of the content prior to sending the plurality of portions to the display. In one embodiment, the method 500 sends 512 the content, including the encoded security display settings for the plurality of portions of the content, to the display for presentation on the display, and the method 500 ends. In one embodiment, the partition module 202, the settings module 204, the encode module 206, and the transmission module 210 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory that stores code executable by the processor to:
logically divide content to be presented on a display into a plurality of portions;
randomly determine security display settings for each of the plurality of portions of the content such that the plurality of portions are presented on the display with their respective security display settings at a frequency above a threshold of human persistence of vision but below camera shutter speeds;
determine random intervals for applying different security display settings such that the same security display settings for the plurality of portions are not applied at the same time;
encode the randomly determined security display settings in metadata for each of the plurality of portions of content and the determined random intervals for applying the different security display settings prior to the content being presented on the display; and
send the content, including the encoded determined random intervals and the encoded security display settings for the plurality of portions of the content, to the display for presentation on the display.

2. The apparatus of claim 1, wherein the security display settings comprise at least one of random refresh rates and frame rates for the plurality of portions such that the portions of the content are presented at different frequencies that are above the threshold of human persistence of vision but below camera shutter speeds.

3. The apparatus of claim 1, wherein the security display settings comprise random intervals for the plurality of portions to present a blank display instead of the content for the plurality of portions, the intervals being above the threshold of human persistence of vision but below camera shutter speeds.

4. The apparatus of claim 1, wherein the security display settings comprise random brightness settings for the plurality of portions such that the brightness settings for the plurality of portions are altered at a rate that is above the threshold of human persistence of vision but below camera shutter speeds.

5. The apparatus of claim 1, wherein the code is executable by the processor to randomly scramble the plurality of portions prior to sending the content to the display such that the plurality of portions are presented in a random order when presented on displays that do not support decoding the encoded security display settings.

6. The apparatus of claim 5, wherein the code is executable by the processor to encrypt the scrambled plurality of portions of the content prior to sending the plurality of portions to the display.

7. The apparatus of claim 5, wherein information that is used to scramble the plurality of portions is sent to the display for use in descrambling the plurality of portions prior to presenting the content on the display.

8. The apparatus of claim 1, wherein the display comprises a virtual reality display comprising at least two displays, the security display settings for the plurality of portions being applied to portions of the content presented on the at least two displays.

9. The apparatus of claim 1, wherein the frequency for presenting the plurality of portions on the display with their respective security display settings is determined as a function of the camera shutter speeds such that the displayed content appears illegible if captured by a camera.

10. The apparatus of claim 1, wherein the code is executable by the processor to encode the security display settings using a random seed value that is used to randomly determine the security display settings, the random seed value sent to the display and used at the display to decode the security display settings for the plurality of portions.

11. The apparatus of claim 10, wherein the random seed value is one of a plurality of random seed values that are generated and used independently for each of the plurality of portions of the content to determine the security display settings for each portion.

12. The apparatus of claim 1, wherein the content is logically divided into a plurality of portions comprising a plurality of blocks of pixels, and wherein sizes of the blocks are determined as a function of a size of the display.

13. A method, comprising:
logically dividing, by a processor, content to be presented on a display into a plurality of portions;
randomly determining security display settings for each of the plurality of portions of the content such that the plurality of portions are presented on the display with their respective security display settings at a frequency above a threshold of human persistence of vision but below camera shutter speeds;
randomly determining intervals for applying different security display settings such that the same security display settings for the plurality of portions are not applied at the same time;
encoding the randomly determined security display settings in metadata for each of the plurality of portions of content and the determined random intervals for applying the different security display settings prior to the content being presented on the display; and
sending the content, including the encoded determined random intervals and the encoded security display settings for the plurality of portions of the content, to the display for presentation on the display.

14. The method of claim 13, wherein the security display settings comprise at least one of random refresh rates and frame rates for the plurality of portions such that the portions of the content are presented at different frequencies that are above the threshold of human persistence of vision but below camera shutter speeds.

15. The method of claim 13, wherein the security display settings comprise random intervals for the plurality of portions to present a blank display instead of the content for the plurality of portions, the intervals being above the threshold of human persistence of vision but below camera shutter speeds.

16. The method of claim 13, wherein the security display settings comprise random brightness settings for the plurality of portions such that the brightness settings for the plurality of portions are altered at a rate that is above the threshold of human persistence of vision but below camera shutter speeds.

17. The method of claim 13, further comprising randomly scrambling the plurality of portions prior to sending the content to the display such that the plurality of portions are presented in a random order when presented on displays that do not support decoding the encoded security display settings.

18. A computer program product embodied in a computer readable storage medium having program instructions embodied therewith, the program instructions executable by a processor to cause the processor to:

logically divide content to be presented on a display into a plurality of portions;

randomly determine security display settings for each of the plurality of portions of the content such that the plurality of portions are presented on the display with their respective security display settings at a frequency above a threshold of human persistence of vision but below camera shutter speeds;

randomly determine intervals for applying different security display settings such that the same security display settings for the plurality of portions are not applied at the same time;

encode the randomly determined security display settings in metadata for each of the plurality of portions of content and the determined random intervals for applying the different security display settings prior to the content being presented on the display; and send the content, including the encoded determined random intervals and the encoded security display settings for the plurality of portions of the content, to the display for presentation on the display.

19. The computer program product of claim 18, wherein the program instructions further cause the processor to randomly scramble the plurality of portions prior to sending the content to the display such that the plurality of portions are presented in a random order when presented on displays that do not support decoding the encoded security display settings.

20. The computer program product of claim 19, wherein the program instructions further cause the processor to encrypt the scrambled plurality of portions of the content prior to sending the plurality of portions to the display.

* * * * *